S. P. Gary,
Machine Gearing.
Nº 37,165. Patented Dec. 16, 1862.
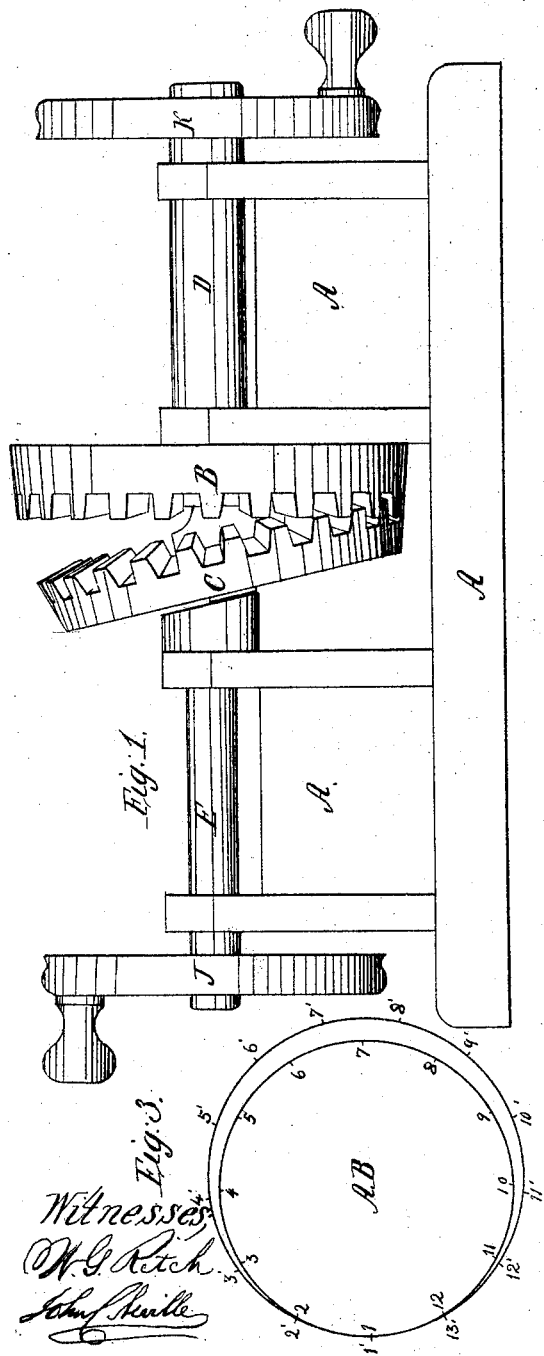
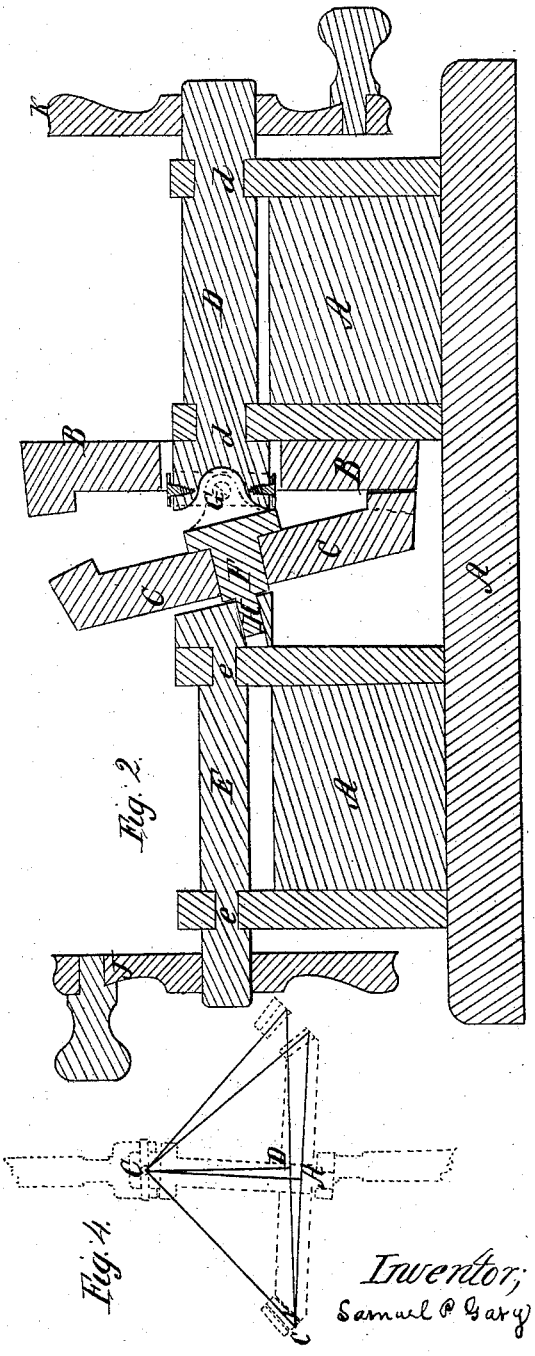

UNITED STATES PATENT OFFICE.

SAMUEL P. GARY, OF OSHKOSH, WISCONSIN.

IMPROVEMENT IN GEARING FOR MACHINERY.

Specification forming part of Letters Patent No. 37,165, dated December 16, 1862.

*To all whom it may concern:*

Be it known that I, SAMUEL P. GARY, of Oshkosh, in the county of Winnebago, in the tate of Wisconsin, have invented a new and improved mode of gearing for the purpose of transmitting rotary motion from one shaft to another at either an increased or diminished speed; and I do hereby declare that the following is a full and exact description thereof, as shown by the drawings accompanying this application, reference being had to the annexed drawings, making a part of this specification, in which—

Figure 1 is a longitudinal elevation. Fig. 2 is a longitudinal vertical section; Figs. 3 and 4, diagrams to explain the nature and mode of operation of my invention.

The object of this invention is to obtain a gearing for the purpose of increasing speed, or of diminishing speed, and thereby increasing power, which shall be more compact and durable, work with less friction, and be cheaper in construction, and at the same time increase the speed or power in a greater ratio than those commonly used.

To enable others skilled in the art to make and use my invention, I will proceed to describe its construction and mode of operation.

In Figs. 1 and 2, A represents a frame-work for the purpose of supporting the working parts of the machine.

D is a shaft supported in bearings $d\ d$, and having at the point G a universal joint, which will allow an inclination of the shaft at that point to a limited extent in any direction, and upon this shaft, beyond the universal joint, at F, is fastened the bevel-wheel C. The wheel C has twenty-four teeth, and gears into the internal bevel-wheel, B, which has twenty-five teeth, and is fastened permanently to the frame-work A. The apex of the primitive cone of each of the wheels is at the center of the universal joint G—in other words, the center of the joint is the point to which all the lines drawn in the direction of the breadth of the teeth of either wheel converge. The wheel B has a hole in its center, through which the shaft D freely passes.

E is another shaft, supported in bearings $e\ e$, and, being enlarged at the end next to the wheels, has a hole bored in it to receive the pin H, which projects from the center of the wheel C at right angles to its back, thus forming a crank at H upon the end of the shaft E. The shafts D and E are each provided with hand-wheels K and J. When the shaft E is turned, it will, by means of the crank at H, carry the center of the wheel C around in a small circle, causing the wheel itself to roll upon the wheel B, and each tooth of C to come successively into gear with the teeth of B; but when the shaft E has turned once around, carrying the center of the wheel C around with it, the wheel itself will have made one twenty-fourth part of a revolution on its own axis in the contrary direction, which motion is, by means of the universal joint, transmitted to the shaft D; and, in like manner, when the shaft E is turned around twenty-four times, the wheel C, and, consequently, the shaft D, will make one complete revolution in the contrary direction; and by turning the shaft D, and, consequently, the wheel C, which is fast upon it, once around, the wheel C will roll around upon the wheel B, and the center of the wheel C will describe a small circle twenty-four times, which motion is, by means of the crank at H, transmitted to the shaft E, and thus the shaft E will revolve twenty-four times to one revolution of the shaft D.

To more fully explain and elucidate the mode of operation and manner of constructing my invention, in Fig. 3 let A be the center of the circle 1 2 3 4 12, which is divided into twelve equal parts at the points 1 2 3 4 12, and B the center of another circle 1′ 2′ 3′ 4′ 13′, exterior to and in contact with the first circle at the point 1 1′, and which is divided into thirteen equal parts at the points 1′ 2′ 3′ 4′ 13′, the divisions in one circle being equal to those in the other, and the diameters of the circles being to each other as twelve to thirteen. For convenience call the inner and smaller circle the circle A, and the outer the circle B. Now, supposing the circle B to be immovable, by turning the circle A upon its center in the direction 1 12, and at the same time letting it roll, without sliding, within the circle B, the point 2 will come in contact with 2′, 3 with 3′, 4 with 4′, 5 with 5′, 6 with 6′, 7 with 7′, 8 with 8′, 9 with 9′, 10 with 10′, 11 with 11′, 12 with 12′, 1 with 13′, and 2 with 1′, when the circle A will have rolled completely around within the circle B, so that the point of contact will be at the same place as at first—viz., 1—and at the same time the circle A will have made one-twelfth of a revolution about its own center, the point 1 being where 12 was at first; but the center A is always in the line joining the center B with the point of contact of the circles, so that when 2 is in contact with 2' the center A will have moved so as to be in the line joining the center B and the point 2', and in the same manner when 3 is in contact with 3', the center A will be in the line joining the center B with 3', and so on, so that while the circle A is rolling around within the circle B its center will describe a whole circle around the center of circle B, although it makes but one-twelfth of a revolution around its own center, and in the same way it will be seen that when the circle A has turned once around its own center the center itself will have made twelve complete revolutions around the center B. By reasoning in the same manner it will be found that whatever the ratio of the circles to each other the number of revolutions that the center A makes around the center B, while the circle A turns once on its own center, will be equal to the ratio of the circle A to the difference between the circles; and if the circles represent the bases of two right cylinders, the vertical lines drawn from 1' 1, parallel to the axes of the cylinders, will coincide, and the interior cylinder will roll and revolve within the other in the same manner as its base-circle within the base-circle of the other, and its axis will describe a small cylinder around the axis of the exterior cylinder. Now, if, instead of the bases of cylinders, the circles represent the bases of two right cones, having their apexes at the same point and touching each other on a line drawn from 1 1' to the apexes, as represented in vertical projection in Fig. 4, then the axis A C of the interior cone will describe a small cone around the axis B C of the exterior cone, and the interior cone will roll and revolve within the exterior cone in the same manner as the interior cylinder within the exterior cylinder; and if the cones represent the primitive cones of bevel-wheels, by supplying the wheels and proper shafts, and a universal joint at C, the apexes of the cones, and a crank at A, the center of the base of the interior cone, as represented in section by the dotted lines of Fig. 4, the gearing will be constructed according to my invention. The particular form and position of the parts are not material. The point C, the apex of each cone, may be removed to an indefinite distance until finally the cones become cylinders and the wheels spur-wheels, the larger of which would be an annular wheel; or the point C may be brought down into the plane of the base of the exterior cone, in which case that cone would become a circle with the teeth perpendicular to the surface; or the point C may be brought still lower, when both of the wheels would be bevel-wheels with the teeth upon the exterior surface. By a similar course of reasoning, supposing the interior circle, A, in Fig. 3, to be stationary, and the outer one, B, to turn and roll around the inner one in the same manner as the inner one was previously supposed to roll within the outer one, it will be found that the center B will describe a circle around the center A in the same direction as the motion of rotation of the circle B, and the number of revolutions made by the center to one revolution of the circle will be the ratio of the circle B to the difference of the circles; and in the actual construction of the machine, if the smaller wheel be fast to the frame-work and the larger one connected with the shafts in the manner described, the shaft, instead of revolving in contrary directions, will revolve in the same direction.

The particular construction of the universal joint and of the crank (shown in Figs. 1 and 2 in the drawings accompanying this specification) is not essential to the working of the machine. It is only necessary that the crank should be substantially a crank, and that at G, the point at which the primitive cone of each of the wheels has its apex, there should be a joint that will allow the shaft D to incline in any direction sufficiently to let the wheel C gear with the wheel B. If the universal joint were at a considerable distance from the wheels, a box or bearing hung in gimbals might be substituted for the joint, and the bearings $d\ d$ be dispensed with, for, though the end of the shaft would have a slight wabbling motion, if the power be applied or taken off by means of a pulley and belt, the wabbling motion would be so little as to occasion no practical inconvenience; and if it is desirable to use spur-wheels in any case, instead of placing the universal joint at an infinite distance from the wheels two universal joints may be put into the shaft D between the wheel C and the bearings of the shaft.

In place of toothed wheels friction-wheels may be used; and whatever construction be adopted, the motion will be transmitted from one shaft to another increased in the ratio of the diameter of the wheel attached to the shaft to the difference of the diameters of the wheels, or decreased in the inverse ratio accordingly as the power is applied to the one shaft or to the other.

Having thus described my invention, what I claim as new, and desire to secure by Letters Patent, is—

The combination of the stationary wheel B with the revolving wheel C, the joint G, and the crank H, for the purpose of transmitting rotary motion from the shaft D to the shaft E, or the reverse, substantially as herein set forth and described.

SAMUEL P. GARY.

Witnesses:
W. G. RITCH,
JOHN C. NEVILLE.